United States Patent [19]

Fyson

[11] Patent Number: 5,244,777
[45] Date of Patent: Sep. 14, 1993

[54] METHOD OF RECOVERING SILVER FROM PHOTOGRAPHIC PROCESSING SOLUTIONS

[75] Inventor: John R. Fyson, Hackney, England

[73] Assignee: Eastman Kodak Company, Rochester, N.Y.

[21] Appl. No.: 613,517

[22] PCT Filed: Apr. 13, 1990

[86] PCT No.: PCT/EP90/00608
§ 371 Date: Nov. 5, 1990
§ 102(e) Date: Nov. 5, 1990

[87] PCT Pub. No.: WO90/12898
PCT Pub. Date: Nov. 1, 1990

[30] Foreign Application Priority Data

Apr. 26, 1989 [GB] United Kingdom ................ 8909577

[51] Int. Cl.$^5$ ................................ G03C 5/38
[52] U.S. Cl. .................. 430/398; 430/400; 430/455
[58] Field of Search ............ 204/109; 75/713; 430/398, 399, 400, 455, 458, 459

[56] References Cited

U.S. PATENT DOCUMENTS

| 4,029,510 | 6/1977 | Speers | 430/8 |
| 4,139,431 | 2/1979 | Scheidegger | 204/109 |
| 4,445,935 | 5/1984 | Posey | 75/713 |
| 5,171,658 | 12/1992 | Fyson | 430/455 |

FOREIGN PATENT DOCUMENTS

| 0252185 | 1/1988 | European Pat. Off. | |
| 2132635 | 7/1984 | United Kingdom | 204/109 |

OTHER PUBLICATIONS

James, *The Theory of the Photographic Process*, Chapter 15, "Complementary Processes", pp. 437–443 (4th ed. (1977).

SMPTE Journal, vol. 86, No. 2, Feb. 1977, D. J. Degenkolb et al.; "Silver Recovery from Photographic Wash Waters by Ion Exchange".

Primary Examiner—Charles L. Bowers, Jr.
Assistant Examiner—Mark F. Huff
Attorney, Agent, or Firm—Nixon, Hargrave, Devans & Doyle

[57] ABSTRACT

A method of recovering silver from used photographic fixer solutions characterized in that the solution contains an alkali metal sulphite as the sole silver halide solvent.

3 Claims, No Drawings

METHOD OF RECOVERING SILVER FROM PHOTOGRAPHIC PROCESSING SOLUTIONS

This invention relates to a method of recovering silver from photographic processing solutions and, in particular to recovering silver from sulphite fixer solutions.

In processing both black-and-white and colour photographic silver halide materials it is necessary to remove unwanted silver halide from the developed material. This is customarily accomplished by using a fixer solution which contains a silver halide solvent, usually a thiosulphate.

Methods are known for recovering silver from spent thiosulphate fixer solutions. It is not, however, possible to use any of these methods "in-line" to extend the working life of the solutions without continuous solution monitoring and solution adjustment, nor does removal of silver leave a solution for disposal (i.e. a solution containing thiosulphate) which is fully environmentally acceptable.

In our cofiled application Ser. No. 07/613,515 to Fyson, filed Nov. 5, 1990, now U.S. Pat. No. 5,171,658, entitled "METHOD OF PHOTOGRAPHIC PROCESSING" there is described and claimed a method for removing unwanted silver chloride from photographic materials using a fixer comprising an alkali metal sulphite as sole silver halide solvent.

According to the present invention there is provided a method of recovering silver from used photographic fixer solutions characterised in that the solution contains an alkali metal sulphite as the sole silver halide solvent.

The advantages of the present invention are that treated fixers can be discharged into sewer systems in areas where limits on silver discharge are low; valuable silver is recovered and available for refining and reuse; and in-line silver recovery increases the life of the fixer and therefore reduces chemical cost to the user.

A number of methods of recovering silver from thiosulphate or thiosulphate plus sulphite fixers are known and similar methods may also be used in the present case. Such methods include:

Electrochemical deposition of silver,
Metal exchange with a less noble metal and
Addition of a powerful reducing agent to reduce the silver sulphite complex to silver metal and the free ligand.

There are additional methods which are not efficient or practical for thiosulphate-containing fixers but are practical for sulphite-only fixers and these are:

Precipitation of silver sulphide by the addition of a water soluble sulphide,
Precipitation of silver sulphide by contacting the silver laden fixer with an insoluble sulphide either added as the free solid or suspended in a matrix,
Addition of a cationic or anionic ion exchange resin, or
Destruction of the silver sulphite complex by the addition of a powerful oxidant or a mineral acid.

Electrochemical silver recovery is carried out by passing current through seasoned fixer between two electrodes made of a suitable material which may be essentially metallic or of one of many forms of carbon. Silver is deposited on the cathode. The electrodes may or may not be rotated to improve plating quality and efficiency.

Metal exchange is a process by which a metal that is more electronegative than silver is added to the fixer in one of many forms, e.g. wire, powder or billets. The electronegative metal displaces the silver from the silver complex precipitating it on the metal surface. Suitable metals include First Row Transition Metals.

Silver can also be precipitated by addition of a powerful reducing agent to the fixer. Complexed silver is reduced and precipitates. Suitable agents would include alkali metal borohydrides and dithionites, alkali metal hydrides and mixed metal hydrides, e.g. lithium aluminium hydride.

Silver can be recovered as silver sulphide from the fixers by addition of an aqueous solution of water soluble sulphides. These include the alkali metal, alkaline earth metal and ammonium sulphides and polysulphides.

Silver can be recovered as silver sulphide by contacting the seasoned fixer with sulphides that are essentially water insoluble. These are all the metal sulphides excluding those of alkali metals, alkaline earth metals and silver sulphide.

Ion-exchange resins can be used to recover silver from sulphite fixers. Both cationic and anionic resins of the so called 'strong' and 'weak' types. For cationic resins silver ions displace the preabsorbed resin counter ion. For anionic resins the silver complex displaces the resin counter ion.

Silver can be recovered from sulphite fixers by destroying the sulphite by the addition of a powerful oxidising agent, e.g. hydrogen peroxide, alkali metal and ammonium persulphates, alkali metal and ammonium dichromates and alkali metal and ammonium permanganates. Once the sulphite is destroyed the free silver can react with any ions present in solution. If fixing was carried out on silver chloride, the reaction will be with chloride ions, precipitating out silver chloride. Addition of a strong mineral acid would have a similar effect, removing the sulphite and allowing the silver to react with anions such as chloride remaining in the fixer.

In apparatus wherein the fixer is recirculated some silver-recovery can be achieved "in-line". Methods suitable in this approach are electrochemical reduction, treatment with ion-exchange resins and treatment with a supported (matrix) of an insoluble metal sulphide. Such in-line recovery of silver will extend the working life of the fixer solution thus reducing cost to the user.

The following examples are included for a better understanding of the invention

EXAMPLES 1–8

In all the following examples the same model seasoned sulphite fixer was used. This was made by dissolving 1.3 g/l silver chloride in a 50 g/l anhydrous sodium sulphite solution. Silver concentration in the fixer was measured using a colorimetric technique marketed by Dr Lange. The starting silver concentration in the test fixer was 820±50 mg/l (as metal). For each test 100 mls of the silver laden fixer was taken and stirred in a beaker with the test reagent for 5 minutes and then filtered. For the electrochemical method two clean stainless steel plates were placed in the solution. The submerged area of each plate was 10 cm$^2$. The electrodes were connected to a 100 mA constant current power supply. The solution was electrolysed for 10 minutes. The table below summarises the results.

| Example Number | Reagent | Amount added g/100 ml | Final Silver mg/l | Silver Recovered mg/l (Start-Final) |
|---|---|---|---|---|
| 1 | Zinc powder | 1 g | 50 ± 50 | 770 ± 70 |
| 2 | Zinc sulphide (powder) | 1 g | 195 ± 30 | 625 ± 60 |
| 3 | KBr | 5 g | 80 ± 40 | 740 ± 65 |
| 4 | $Na_2S_2O_4$ | 1 g | 50 ± 50 | 780 ± 70 |
| 5 | Amberlite IRC-718 | 10 g | 600 ± 50 | 220 ± 70 |
| 6 | Zerolite FF(ip) | 5 g | 650 ± 50 | 170 ± 70 |
| 7 | 30% $H_2O_2$ (v/v) | 6 mls | 30 ± 30 | 790 ± 60 |
| 8 | Electrolysis | | 410 ± 50 | 410 ± 70 |

(The words Amberlite and Zerolite are trade marks).

I claim:

1. A method of recovering silver from used photographic fixer solutions comprising the steps of:
   providing a used photographic fixer solution comprising silver and a silver halide solvent, wherein said solvent is solely an alkali metal sulphite;
   removing said silver from said fixer solution in solid form; and
   recovering said removed silver, wherein said removing and said recovering said silver comprises a method selected from the group consisting of:
   (a) electrochemical deposition of silver,
   (b) precipitation of silver sulphide by the addition of a water soluble sulphide,
   (c) precipitation of silver sulphide by contacting the silver laden fixer with an insoluble sulphide either added as the free solid or suspended in a matrix,
   (d) addition of a cationic or anionic ion exchange resin, and
   (e) destruction of the silver sulphite complex by the addition of a powerful oxidant or a mineral acid.

2. A method of photographic processing which employs a fixing bath containing a sulphite as sole fixing agent from which silver is recovered by the method of claim 1.

3. A method as claimed in claim 1, wherein said silver halide is silver chloride.

* * * * *